United States Patent
Rossmann et al.

(10) Patent No.: US 8,889,057 B2
(45) Date of Patent: Nov. 18, 2014

(54) STRETCH BLOW MOULDING MACHINE WITH INTEGRATED COMPRESSOR

(75) Inventors: Stefan Rossmann, Bad Abbach (DE); Klaus Voth, Obertraubling (DE); Peter Christiansen, Hamburg (DE)

(73) Assignee: Krones AG, Neutraubling (DE)

( * ) Notice: Subject to any disclaimer, the term of this patent is extended or adjusted under 35 U.S.C. 154(b) by 306 days.

(21) Appl. No.: 13/184,491

(22) Filed: Jul. 15, 2011

(65) Prior Publication Data
US 2012/0187609 A1    Jul. 26, 2012

(30) Foreign Application Priority Data

Jul. 30, 2010   (DE) .................. 10 2010 032 965

(51) Int. Cl.
| | |
|---|---|
| B29C 49/36 | (2006.01) |
| B29C 49/42 | (2006.01) |
| B29C 49/78 | (2006.01) |
| B29C 49/12 | (2006.01) |

(52) U.S. Cl.
CPC .......... B29C 49/42 (2013.01); *B29C 49/783* (2013.01); *B29C 49/36* (2013.01); *B29C 2049/1257* (2013.01); *B29C 49/12* (2013.01)
USPC ........................ 264/523; 425/535; 425/540

(58) Field of Classification Search
USPC ..................... 425/535, 540; 264/523
See application file for complete search history.

(56) References Cited

U.S. PATENT DOCUMENTS

| | | | | |
|---|---|---|---|---|
| 5,817,348 | A  * | 10/1998 | Ikeda ........................ | 425/529 |
| 7,399,177 | B2 * | 7/2008 | Brachet et al. ............ | 425/529 |
| 7,790,097 | B2 * | 9/2010 | Litzenberg et al. ........ | 264/531 |
| 7,972,130 | B1 * | 7/2011 | Hussain ..................... | 425/526 |
| 2007/0114703 | A1 * | 5/2007 | Jaksztat et al. ............ | 264/523 |
| 2012/0098165 | A1 * | 4/2012 | Baumgarte et al. ........ | 264/523 |

FOREIGN PATENT DOCUMENTS

| | | |
|---|---|---|
| CN | 201224170 Y * | 4/2009 |
| DE | 102009019008 A1 * | 10/2010 |

OTHER PUBLICATIONS

Partial translation of CN 201224170Y dated Apr. 2009 obtained from the google patent website.*
A. Barber, Pneumatic Handbook, Eight Edition, 1997, p. 65, Elsevier.*

* cited by examiner

*Primary Examiner* — Robert B Davis
(74) *Attorney, Agent, or Firm* — Novak Druce Connolly Bove + Quigg $^{LLP}$

(57) ABSTRACT

An apparatus for shaping plastics material pre-forms to form plastics material containers may include at least one blowing station, a compressed air supply, and a compressor device. The blowing station forms a hollow space in the interior of which the plastics material pre-forms are capable of being shaped to form plastics material containers. The compressed air supply supplies the compressed air to at least one element of the blowing station, and the compressor device produces the compressed air. The compressor device is arranged in the vicinity of the apparatus in such a way that a flow connection between the compressor device and the blowing station is shorter than 15 m.

14 Claims, 4 Drawing Sheets

Fig. 3
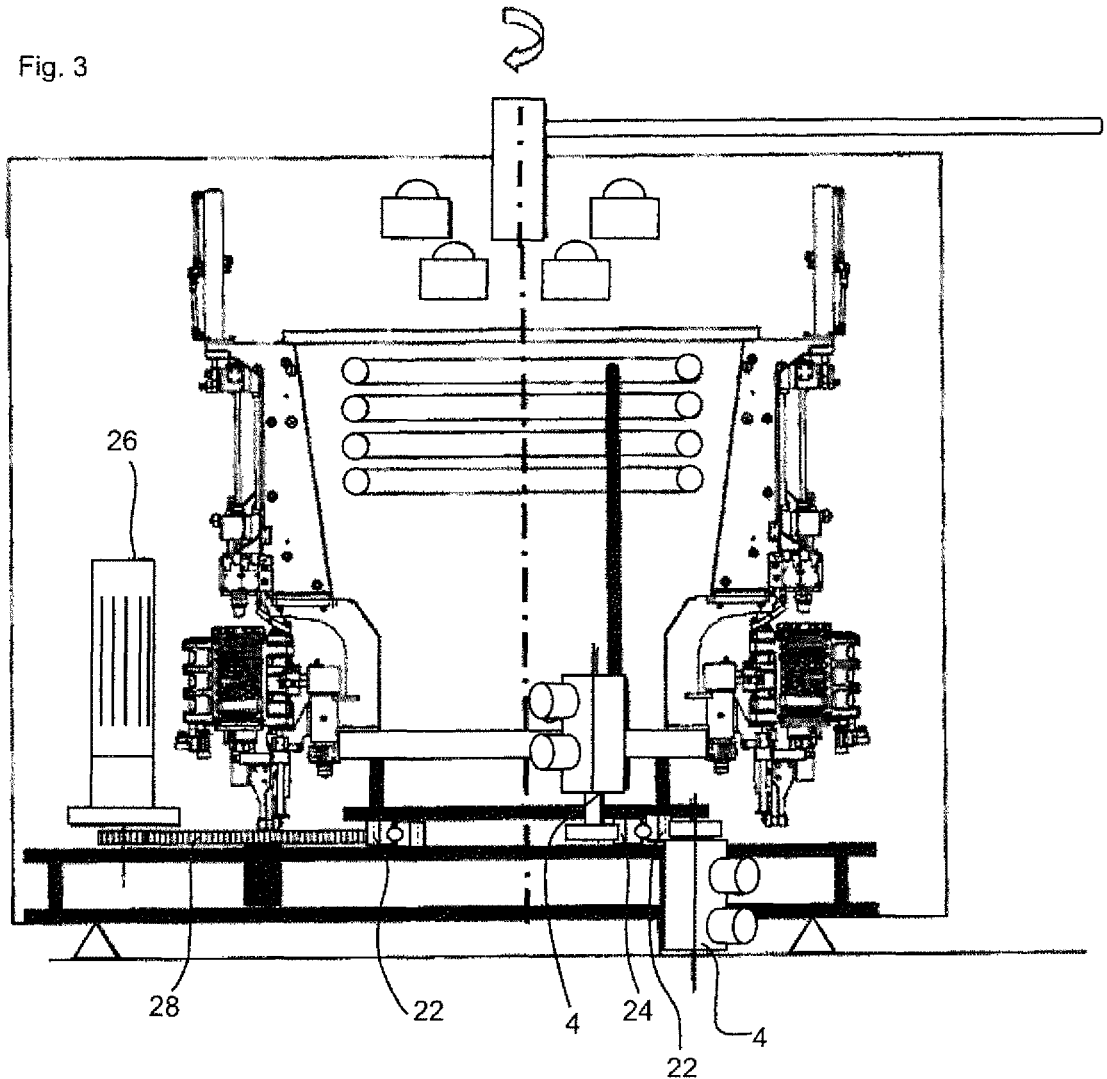
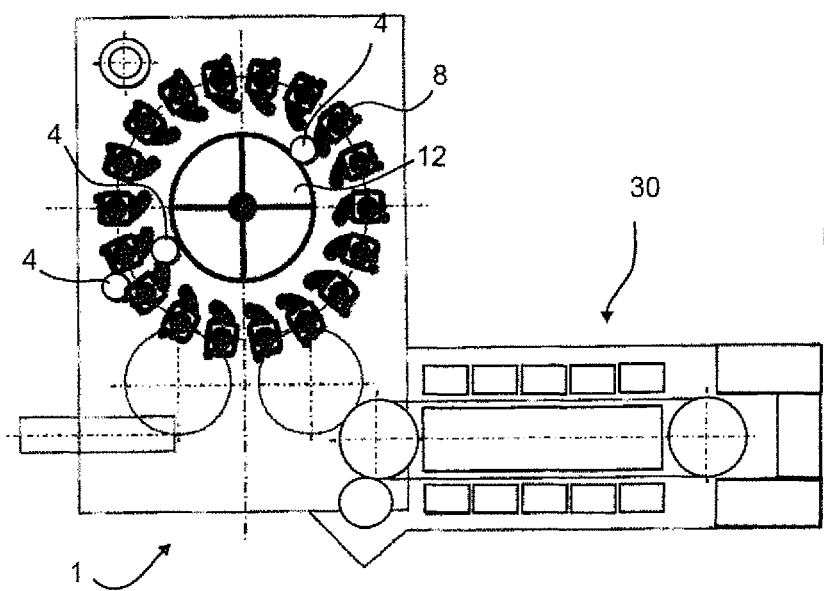
Fig. 4

STRETCH BLOW MOULDING MACHINE WITH INTEGRATED COMPRESSOR

CROSS-REFERENCE TO RELATED APPLICATION

This application claims the benefit of priority of German Patent Application No. 10 2010 032 965.7, filed Jul. 30, 2010, pursuant to 35 U.S.C. 119(a)-(d), the disclosure of which is incorporated herein by reference.

TECHNICAL FIELD

The present disclosure relates to a method of blow moulding containers, for example, plastics material containers, in which a plastics material pre-form is shaped from a thermoplastic material, for example, after a thermal conditioning along a conveying path in the region of a heating path inside a blow mould during the action of compressed air in a container.

BACKGROUND

Methods of this type and corresponding apparatus have long been known from the prior art. The disclosure further relates to an apparatus for blow moulding containers from a thermoplastic material, in which a compressor produces compressed air in the stretch blow moulding machine, this compressed air being used for the use of pneumatic consumer devices and/or also for shaping the plastics material pre-forms into the containers.

A blow moulding method of producing hollow bodies from plastics material, as well as an apparatus and an installation for performing this method are provided by DE 20 2005 020 679 U1.

In this case a crucial problem in the case of this shaping is the high consumption of compressed air of stretch blow moulding machines of this type. It is usual for the compressed air to be produced by way of an external compressor, this compressor generally producing a pressure of up to 40 bar and this high pressure level then being supplied to the stretch blow moulding machine. In the machine itself this pressure is then reduced to the required pressures, for example for pre-blowing or for final-blowing the plastics material containers. In this way, for example, a first pressure level can be between 6 and 25 bar and a second pressure level between 25 and 40 bar. In addition, a pressure of constantly 10 bar is required for the control valves of the apparatus, in which case this pressure can also be less depending upon the valves.

To a certain extent a streching rod also moves into the container in a pneumatic manner during the shaping, in order to assist the shaping process. In this case the corresponding pneumatic cylinder has a pressure level of 8 bar while moving in and a pressure of from 3 to 8 bar while moving out.

It may be desirable to make available a method and an apparatus by which the energy consumption for the compressed air supply is reduced.

SUMMARY

An apparatus according to the disclosure for shaping plastics material pre-forms to form plastics material containers has at least one blowing station which forms a hollow space below which the plastics material pre-forms are capable of being shaped to form plastics material containers. In addition, a compressed air supply is provided which supplies compressed air to at least one element of the blowing station, and, furthermore, a compressor device is provided for producing the compressed air.

According to the disclosure the compressor device is arranged in the vicinity of the apparatus in such a way that a flow connection between the compressor device and the blowing station is less than 15 m.

It is thus proposed that the compressor device should be arranged in and/or on the stretch blow moulding machine or in and/or on a region of the stretch blow moulding machine and that this compressor device (should) supply at least part of the required pneumatic consumer devices with compressed air. In this way, it would be possible for a geometrical distance between the stretch blow moulding machine or elements thereof and the compressor device to be less than 10 m, in some aspects less than 8 m, in some aspects less than 6 m, and in some aspects less than 5 m. In the case of apparatus known from the prior art the compressors are usually arranged at a great distance from the actual stretch blow moulding machine and are connected to it by way of very long lines.

On account of providing the comparatively short flow connection or on account of short lines, it is possible to save pressure and thus energy. It may be desirable for the apparatus for shaping plastics material pre-forms to be a so-called stretch blow moulding machine, which also has a streching rod which stretches the containers in the longitudinal direction thereof. In this case the hollow space is in some aspects formed inside a blow mould, the plastics material pre-forms being expanded against an inner wall of this blow mould.

The aforesaid element of the blowing station can be for example a blowing nozzle which acts upon the plastics material pre-forms with compressed air. In addition, however, it can also be a streching rod which is moved pneumatically. In addition, it would also be possible to use the compressed air for switching valves. It may be advantageous in some aspects for a plurality of consumer devices of the apparatus to be supplied with compressed air.

It may be advantageous in some aspects for the apparatus to have a heating device which in a conveying direction of the plastics material pre-forms is arranged upstream with respect to the apparatus for shaping, the plastics material pre-forms being conveyed through this heating device. In this way, a thermal conditioning is possible along the conveying path in the region of this heating path. It may be advantageous in some aspects for the compressor device to be arranged in the blow moulding machine itself, for example in a movable region of the blow moulding machine, such as a blowing wheel, or even in the vicinity thereof in a stationary part of the blow moulding machine. In this way, the compressor device can also be provided adjacent to the blowing wheel.

It may be advantageous in some aspects for the apparatus to have a plurality of blowing stations which are arranged on a movable support, and in some aspects on a rotatable support, and for the compressor device to supply a plurality of these blowing stations and in some aspects all these blowing stations with compressed air. In this embodiment the compressor device is arranged on the blowing wheel and supplies the pneumatic consumer devices, which are likewise arranged on the blowing wheel, with compressed air. In this way, in this embodiment the compressor device is arranged on the rotatable support and moves jointly with it. It would also be possible, however, for the compressor device to be arranged on a stationary part of the blow moulding machine. This rotatable support device can be for example a so-called blowing wheel on which the individual blowing stations are arranged.

In the case of a an exemplary embodiment the compressor device is driven by a rotary movement of the support. In this case it is possible for the blowing wheel to be mounted by way of a ball-bearing supported ring and for the compressor device to be driven by way of this ball-bearing supported ring. In this embodiment the compressor device itself can be arranged in both a stationary and a movable manner.

In the case of a further embodiment the compressor device has a separate drive, for example in the form of an electric motor. It would also be possible, however, for the compressor device to be driven by the movements of other conveying devices, such as for example the movements of supply star wheels or removal star wheels. These supply star wheels in some aspects supply the plastics material pre-forms to the stretch blow moulding machine. The removal star wheels remove the containers from the stretch blow moulding machine.

In general, it may be advantageous in some aspects for the compressor device to be driven by a conveying movement of the apparatus, i.e. by the movement of at least one element of the apparatus, which results in a movement of the plastics material pre-forms or the containers produced from them.

In the case of an exemplary embodiment at least one blowing station has a streching rod for stretching the plastics material pre-forms and a movement of this streching rod is driven at least in part by compressed air produced by the compressor device. In this case, compressed air produced is to be understood as meaning that air is produced under a pressure which is increased with respect to the atmosphere, for example, a pressure in the range of from 10 to 40 bar.

In the case of an exemplary embodiment the compressor device supplies at least one control valve, in some aspects a plurality of control valves, and in some aspects all the control valves, with compressed air. In this case this control valve can control the supply of compressed air into the container.

In the case of an exemplary embodiment the compressor device delivers blowing air in order to expand the plastics material pre-forms. In this case it is possible for the compressor device to deliver blowing air for the pre-blowing of the plastics material pre-forms at a first pressure level, but it would also be possible for the compressor device to deliver blowing air for the final-blowing of the plastics material pre-forms.

In the case of an exemplary embodiment the apparatus has a further compressor device, in which case there is a flow connection between this further compressor device and the compressor device described above. For example, at least one of these two compressor devices is arranged closer than 15 m to at least one blowing station. It is pointed out, however, that the variant described here with the two compressor devices is also possible independently of the distance of less than 15 m from the blowing station as described above. The Applicants retain the right to claim protection separately for the embodiment.

In the case of an exemplary embodiment the first and the further compressor device make available different starting pressures. In this way it is possible for the further compressor device to make available a specified basic pressure which is subsequently increased by the compressor device mentioned above. In this arrangement the further compressor device mentioned acts as a compressor device which makes available a specified basic pressure and the compressor device described above increases this. In this case the last-named compressor device can also be referred to as a booster, i.e. a compressor which does not compress from atmospheric pressure but from a certain pressure level, such as for example 6 bar. One possible advantage of this arrangement is that these boosters do not draw any contaminated external air out of the environment, since the supply of compressed air takes place directly through air recycling or the shortfall from the low-pressure network. This is an advantage as compared with standard compressors.

In addition, the doubled pipe arrangement can be dispensed with in this way, since with the recycling of compressed air a pipeline can be put back directly from the stretch blow moulding machine into the booster.

In the case of an exemplary embodiment at least one line used for the return of air is provided between at least one blowing station and at least one compressor device.

In the case of an exemplary embodiment it is also possible for two or more return lines to be led from the blowing stations to at least one compressor device. In this way, for example, a return feed of a pressure of from 10 to 13 bar can take place from the blow moulding machine into the compressor device mentioned above and, additionally with a further line, a return feed from a pressure level of between 4 and 7 bar from the blow moulding machine or the blowing stations into at least one compressor device. In this case it is possible for a lower return feed pressure of for example from 5 to 7 bar to be fed in before a first stage of the compressor device, i.e. the booster. In this case this booster can be a piston or a turbo-compressor. Further pressures can be fed in in the following stages, for example 15 bar between the first and second stages. In the case of a exemplary embodiment this return feed does not take place into the compressed air line between the first and second stages, but into a low pressure tank arranged between them. It is thus proposed in this case that a recycling of compressed air is carried out in which a multiplicity of different return feed pressures are applied.

In the case of an exemplary embodiment the compressor device is set up adjacent to a stretch blow moulding machine for example. A compressed air tank, which can be supplied by recycling processes of the stretch blow moulding machine, is in some aspects arranged at an inlet of this compressor device. In the event of a drop in pressure below a settable minimum (pressure min.), the air additionally required is delivered through the low pressure compressor mentioned above, i.e. the further compressor device. In this case the settings on the compressed air tank are in some aspects fixed in such a way that use is made of air recycled in a primary manner from the blow moulding machine. The remaining requirement is made available in a secondary manner from the low pressure network, i.e. through the further compressor device.

In the case of an exemplary embodiment compressed air hystereses can be set on this compressed air tank. In this case the regulation can in some aspects be carried out by pressure-dependent valves.

The present disclosure further relates to a method of shaping plastics material pre-forms into plastics material containers, in which the plastics material pre-forms are acted upon with compressed air inside at least one blowing station and are shaped to form the plastics material containers, and in which compressed air is supplied to the blowing station and a compressor device produces the compressed air.

According to the disclosure the compressed air is conveyed, starting from the compressor device or between the compressor device and the blowing station, along a flow connection which is less than 15 m. It may be advantageous in some aspects for the flow connection to be smaller than 12 m, and in some aspects smaller than 10 m and in some aspects smaller than 8 m. This flow connection can be for example a compressed air line which extends from the compressor device to the blowing stations or to the element to be actuated respectively. It would also be possible for the flow connection to lead from the compressor device into a distributor duct which in turn supplies a plurality of blowing stations with compressed air. In this way the compressed air is some aspects supplied to a central line and is supplied from the central line to a plurality of blowing stations.

It may be advantageous in some aspects for the compressor device to be driven by a conveying movement of the blowing station. This can be for example a rotational movement of the blowing wheel, which in turn drives the compressor device.

In the case of an exemplary method at least one further compressor device supplies the compressor device mentioned above with compressed air. In this case it may be advantageous for compressed air from the blow moulding machine to be fed back to at least one compressor device and some aspects to the compressor device already described in the introduction. In this case it may be advantageously possible for this compressed air to be fed back at least two different pressure levels.

In the case of an exemplary embodiment the shaping device has a tempering device in order to temper constituents of the shaping device. In this case this tempering device may also be advantageously connected in terms of flow to at least one compressor device. At present the cooling plants and the tempering appliances are tempered separately from compressors and stretch blow moulding machines. In this embodiment it is proposed that use should be made of waste heat and cold from machines, such as for example the compressor and the stretch blow moulding machine in order to supply other processes with it. In this way, it would be possible for example, in the case of stretch blow moulding machines with tempering appliances, such as for example for a hot fill or a similar process, for the cooling water of the compressor to be used for heating the media in the tempering appliance. In addition, it would be possible for the colder cooling water of the stretch blow moulding machine to be used for cooling the cooling water of the compressor.

Further advantages and embodiments may be seen from the accompanying drawings.

BRIEF DESCRIPTION OF THE DRAWINGS

In the drawings:

FIG. 3 shows an exemplary apparatus according to the disclosure in a third embodiment;

FIG. 4 is a view of an exemplary plant with an apparatus according to the disclosure.

DETAILED DESCRIPTION

Figure 1:
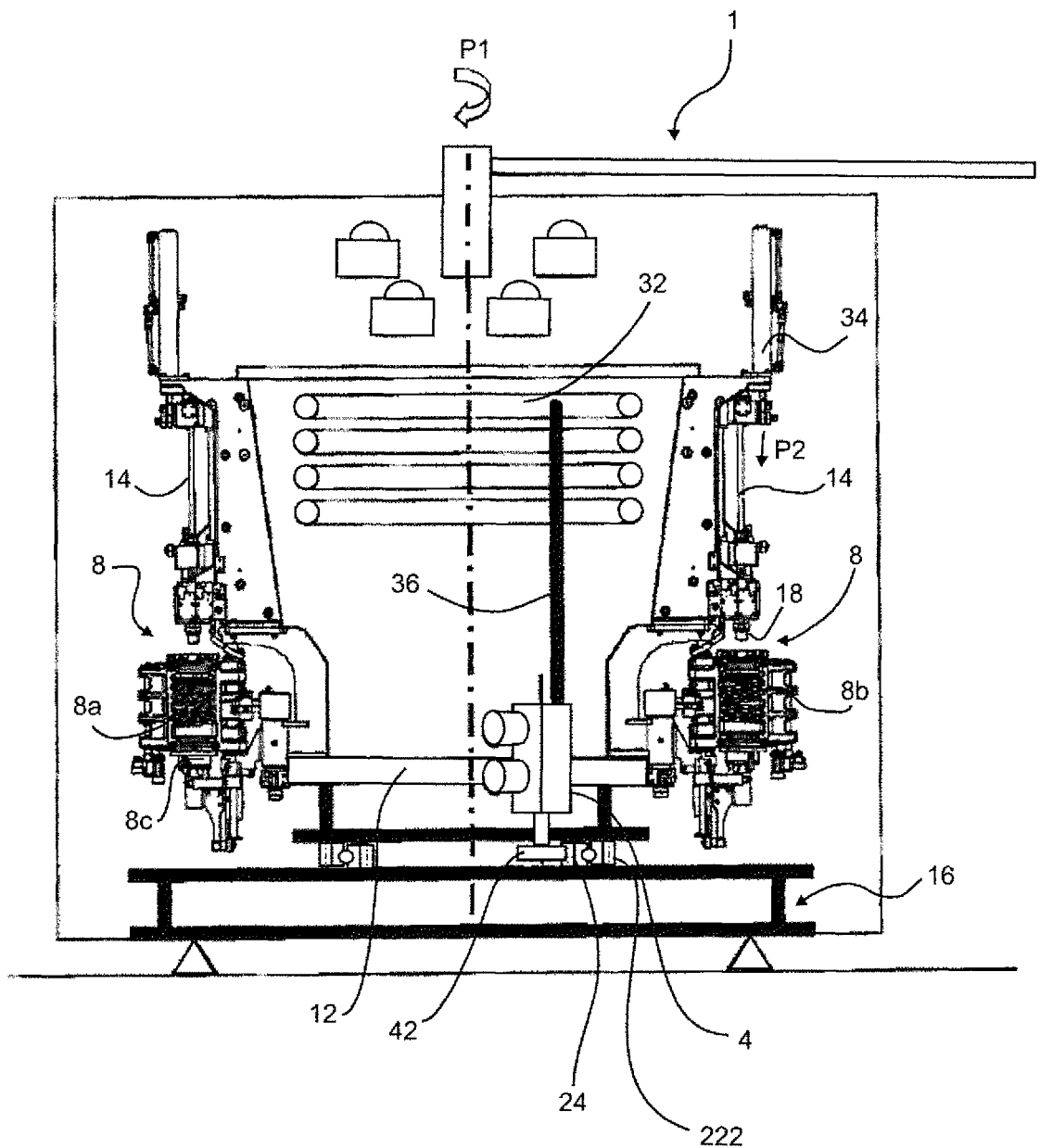
FIG. 1 is a diagrammatic illustration of an exemplary apparatus according to the disclosure in a first embodiment.

FIG. 1 shows an apparatus 1 according to the disclosure in a first embodiment. In this case a blowing wheel 12 is arranged so as to be rotatable with respect to a support 16. The blowing wheel 12 is driven in a rotating manner (arrow P1) by a drive device. A plurality of blowing stations 8 are arranged on this blowing wheel 12, each of these blowing stations having two lateral parts 8a and 8b as well as a base part 8c which in the interior thereof form a hollow space inside which the plastics material pre-form is capable of being expanded or is expanded to form a plastics material container. The reference number 18 relates to a blowing nozzle which is capable of being placed on the apertures of the plastics material pre-forms in order to expand them to form plastics material containers by acting upon them with compressed air.

The reference number 14 designates a streching rod which is movable in the direction P2 in order to expand the plastics material pre-forms. A pneumatic cylinder 34 is provided in order to produce the movement to the streching rod 14. The reference number 4 designates a compressor device which is used to produce the compressed air. Starting from the compressor device, this compressed air is conveyed by way of a supply line 36 into a central duct 32, from which the individual blowing stations can be supplied in turn with compressed air. In this case it would be possible for a plurality of ducts or annular ducts of this type to be provided, from which the individual blowing stations are supplied in turn at different pressure levels for example. In this case the supply line 36 has a length which is smaller than 14 m, in some aspects smaller than 12 m, in some aspects smaller than 10 m, in some aspects smaller than 8 m and in some aspects smaller than 6 m.

In the case of the embodiments shown here the compressor device is arranged on the blowing wheel and in a manner rotatable therewith. The reference number 42 designates a driving wheel which drives the compressor and which in turn engages with a bearing part 24 arranged so as to be stationary. Expressed in more precise terms, this bearing part 24 can have a toothed wheel with an internal set of teeth, which is fixed and opposite which a second bearing part 222 is mounted in a rotating manner. The blowing wheel 12 is arranged in turn on this second bearing part 222, so that it is rotatable as a whole. In this way, the compressor is moved jointly by the rotary movement of the blowing wheel 12 and in this way is driven by way of its driving wheel 42.

Figure 2:
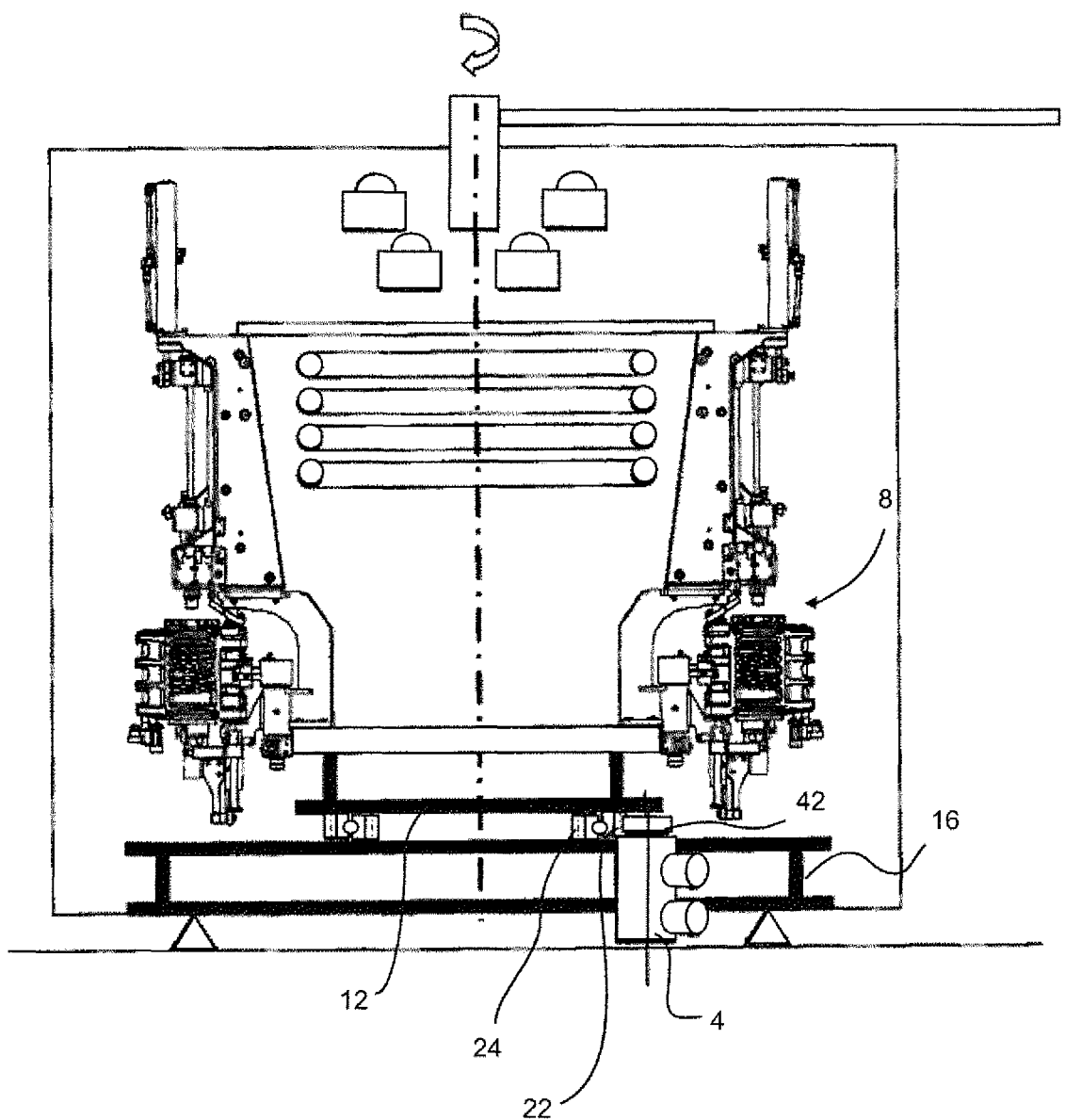
FIG. 2 shows an exemplary apparatus according to the disclosure in a second embodiment.

FIG. 2 shows a further embodiment of an apparatus according to the disclosure. In the case of this embodiment the compressor 4 is arranged so as to be stationary, for example on the support 16 of the apparatus, and in this case it is likewise driven by the rotary movement of the blowing wheel 12, in which case, however, a toothed wheel 22 with an external set of teeth can be provided, which in turn drives the driving wheel 42 of the compressor 4. The compressed air produced by the compressor device 4 can be conveyed for example by way of a rotary distributor to the individual blowing stations.

In the case of the embodiment shown in FIG. 3 both a compressor device is arranged on the blowing wheel 12 and a further compressor device 4 is arranged in a stationary manner. In this case the two compressor devices are driven by the rotation of the blowing wheel 12, and in this way the two compressor arrangements can produce compressed air in order to supply parts of the blowing stations 8 with it.

The reference number 26 relates to a drive device which drives the toothed wheel 22 by way of a toothed wheel 28 and in this way also drives the blowing wheel 12.

FIG. 4 is an illustration of a plant with an apparatus 1 according to the disclosure. In this case, as known from the prior art, the apparatus 1 has arranged in front of it a heating device 30 through which plastics material pre forms are conveyed and are heated in this way. This heating device is an infrared furnace through which the plastics material pre-forms are moved. If desired, it would also be possible for hot waste air from this heating device 30 to be supplied to the compressor devices 4, so that the latter brings this heated air to a higher pressure stage. Instead of an infrared heating device, however, it would also be possible for microwave heating devices or combinations of microwave heating devices and infrared heating devices to be provided.

In the case of this embodiment two compressor devices 4 are provided on the blowing wheel 12, as well as a further compressor device 4 in a stationary manner and thus outside the blowing wheel.

Figure 5:
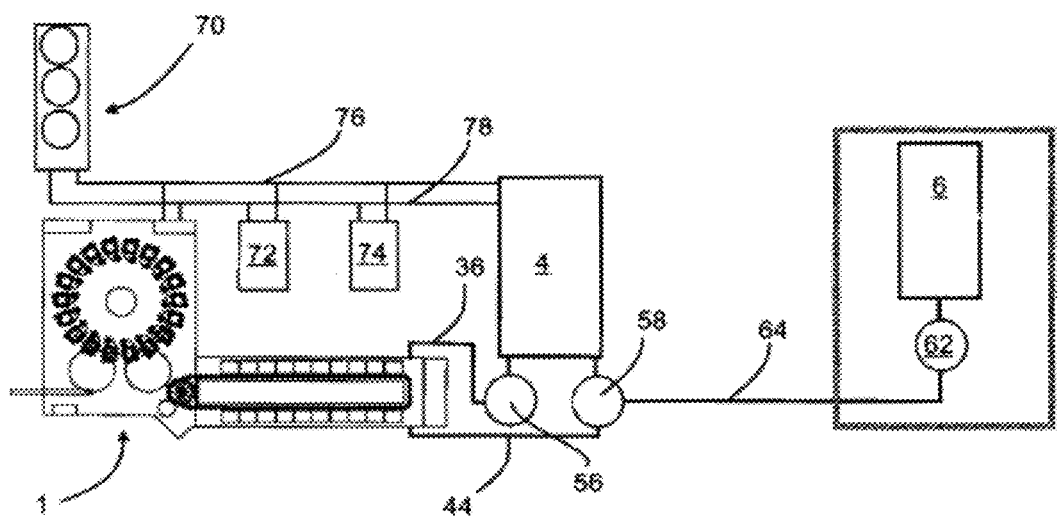
FIG. 5 shows a further embodiment of an exemplary plant according to the disclosure.

FIG. 5 shows a further embodiment of a plant according to the disclosure. In the case of this embodiment a further compressor device 6 is provided, which is used in this case for producing a low pressure, for example between 5 and 10 bar, and for supplying it to the compressor device 4. In this case the reference number 62 designates a pressure accumulator which is attached to the further compressor device 6. The pressure is conveyed by way of the supply line 64 into a reservoir 58 and it can pass from there into the compressor device 4. In addition, a return line 44 is also provided, by way of which pressure of for example from 5 to 10 bar can likewise be conveyed from the blow moulding machine into the reservoir 58 and thus into the compressor device 4. This compressor device 4, which is designed in this case in the form of a booster, increases the pressure and conveys it by way of a supply line 36 and a reservoir 56 to the blow moulding machine. The minimum intake pressure for the compressor device 4 is approximately 6 bar in this case. The recycling of air by way of the return line 44 is carried out in this case at a pressure of approximately 8 bar. The low pressure network, comprising the compressor device 6 and the reservoir 62, is in some aspects limited in this case to a pressure of approximately 7.5 bar, in which case, however, the pressure amounts to at least 6.5 bar. This further compressor device 6 can be arranged at a greater distance from the blow moulding machine 1 and can be arranged for example in a separate storage space.

If the air recycling system delivers sufficient volume, i.e. pressure in the range of 8 bar, to the stretch blow moulding machine during the production, the pressure does not drop below 7.5 bar at the intake reservoir 58. In this way it is possible for the recycled air to be used directly for the compressor device 4, i.e. the booster.

If the volume is no longer sufficient, the pressure in the reservoir drops below 7.5 bar. In this case compressed air is removed from the low pressure network, i.e. the compressor device 6, by way of a valve. This leads to the pressure levelling out in a range of between 6.5 and 7.5 bar depending upon the decrease. Since, however, the pressure does not drop below 6 bar, the compressor device 4 is always adequately supplied with compressed air.

In this way it is possible for recycled air always to be used efficiently with a connection, so that in this case too the compressor device 4 can be arranged directly adjacent to the stretch blow moulding machine, as a result of which a minor pipe arrangement in turn is required. In addition, external air can be prevented from being drawn in.

The operating range of the compressor device is, as mentioned above, at approximately 6 bar, in which case the low pressure network consequently makes this pressure available in a pressure range of between 6.5 and 7.5 bar and thus acts as an additional supply if the air recycling volume is too small. In the range of between 8 and 9 bar, mentioned above, the compressed air recycling operates by way of the return line 44.

In this case the compressor device described in the introduction, which is arranged close to the blow moulding machine, is such a device as to produce, starting from a specified pressure level which is above atmospheric pressure, an increase in the compressed air.

The system illustrated here may be advantageous in the case of stretch blow moulding machines with a high recycling potential, such as for example stretch blow moulding machines which are used for a hot fill process. In addition, this system can be used in factories or bottling companies with a plurality of plants, since large quantities of recycled air occur in this case, and this can be utilized advantageously in terms of energy.

The reference number 70 designates a tempering system for tempering the blow moulding machine. In this case, in detail, the reference numbers 72 and 74 designate two tempering appliances, for example for heating or cooling specified parts of the plant. The reference numbers 76 and 78 designate connecting lines which supply a tempering medium from the cooler 70 to the respective tempering appliances 72 and 74 and also the stretch blow moulding machine 1. In addition, connections to the compressor device 4 can also exist, as a result of which the compressor device 4 is also integrated into the tempering of the plant.

The Applicants retain the right to claim all the features disclosed in the application documents as being essential to the invention, insofar as they are novel either individually or in combination as compared with the prior art.

It will be apparent to those skilled in the art that various modifications and variations can be made to the stretch blow moulding machine with integrated compressor of the present disclosure without departing from the scope of the invention. Throughout the disclosure, use of the terms "a," "an," and "the" may include one or more of the elements to which they refer. Other embodiments of the invention will be apparent to those skilled in the art from consideration of the specification and practice of the invention disclosed herein. It is intended that the specification and examples be considered as exemplary only.

What is claimed is:

1. An apparatus for stretch blow moulding of plastics material pre-forms to form plastics material containers, comprising:
   at least one blowing station which forms a hollow space in the interior of which the plastics material pre-forms are capable of being shaped to form plastics material containers;
   a compressor device for producing compressed air;
   a compressed air supply which supplies the compressed air to at least one element of the blowing station; and
   a plurality of blowing stations arranged on a rotatable support the compressor device supplying said at least one blowing station with compressed air,
   wherein the compressor device is arranged in the vicinity of the apparatus in such a way that a flow connection between the compressor device and the blowing station is shorter than 15 m, and
   wherein the compressor device is arranged on the rotatable support.

2. An apparatus according to claim 1, wherein the compressor device is driven by a rotary movement of the support.

3. An apparatus according to claim 1, wherein at least one blowing station has a stretching rod for stretching the plastics material pre-forms, and wherein a movement of this stretching rod is driven at least in part by compressed air produced by the compressor device.

4. An apparatus according to claim 1, wherein the compressor device supplies at least one control valve with compressed air.

5. An apparatus according to claim 1, wherein the compressor device delivers blowing air in order to expand the plastics material pre-forms.

6. An apparatus according to claim 1, further comprising a second compressor device, wherein there is a flow connection between this second compressor device and the compressor device.

7. A method of shaping blow molding of plastics material pre-forms into plastics material containers, comprising:
provide the apparatus of claim 1;
producing compressed air via the compressor device;
supplying the compressed air to the blowing station, the compressed air being conveyed between the compressor device and the blowing station along the flow connection which is less than 15 m;
acting upon plastics material pre-forms with compressed air inside the at least one blowing station and shaping the pre-forms to form plastics material containers; and
at least one of (1) supplying the compressed air to a central line and supplying the compressed air from the central line to a plurality of blowing stations or (2) supplying the compressor device with compressed air from a second compressor device.

8. A method according to claim 7, further comprising supplying the compressed air to a central line and supplying the compressed air from the central line to a plurality of blowing stations.

9. An apparatus according to claim 1, wherein a geometrical distance between the stretch blow moulding machine or elements thereof and the compressor device is less than 10 m.

10. An apparatus according to claim 1, wherein a geometrical distance between the stretch blow moulding machine or elements thereof and the compressor device is less than 8 m.

11. An apparatus according to claim 1, wherein a geometrical distance between the stretch blow moulding machine or elements thereof and the compressor device is less than 6 m.

12. An apparatus according to claim 1, wherein a geometrical distance between the stretch blow moulding machine or elements thereof and the compressor device is less than 5 m.

13. An apparatus for stretch blow moulding of plastics material pre-forms to form plastics material containers, comprising:
at least one blowing station which forms a hollow space in the interior of which the plastics material pre-forms are capable of being shaped to form plastics material containers;
a compressor device for producing compressed air;
a compressed air supply which supplies the compressed air to at least one element of the blowing station; and
a plurality of blowing stations arranged on a rotatable support the compressor device supplying said at least one blowing station with compressed air,
wherein the compressor device is arranged in the vicinity of the apparatus in such a way that a flow connection between the compressor device and the blowing station is shorter than 15 m, and
wherein the compressor device is driven by a rotary movement of the support.

14. An apparatus for stretch blow moulding of plastics material pre-forms to form plastics material containers, comprising:
at least one blowing station which forms a hollow space in the interior of which the plastics material pre-forms are capable of being shaped to form plastics material containers;
a compressor device for producing compressed air;
a compressed air supply which supplies the compressed air to at least one element of the blowing station;
a plurality of blowing stations arranged on a rotatable support the compressor device supplying said at least one blowing station with compressed air; and
a second compressor device, wherein there is a flow connection between this second compressor device and the compressor device,
wherein the compressor device is arranged in the vicinity of the apparatus in such a way that a flow connection between the compressor device and the blowing station is shorter than 15 m.

\* \* \* \* \*